Figure 1:
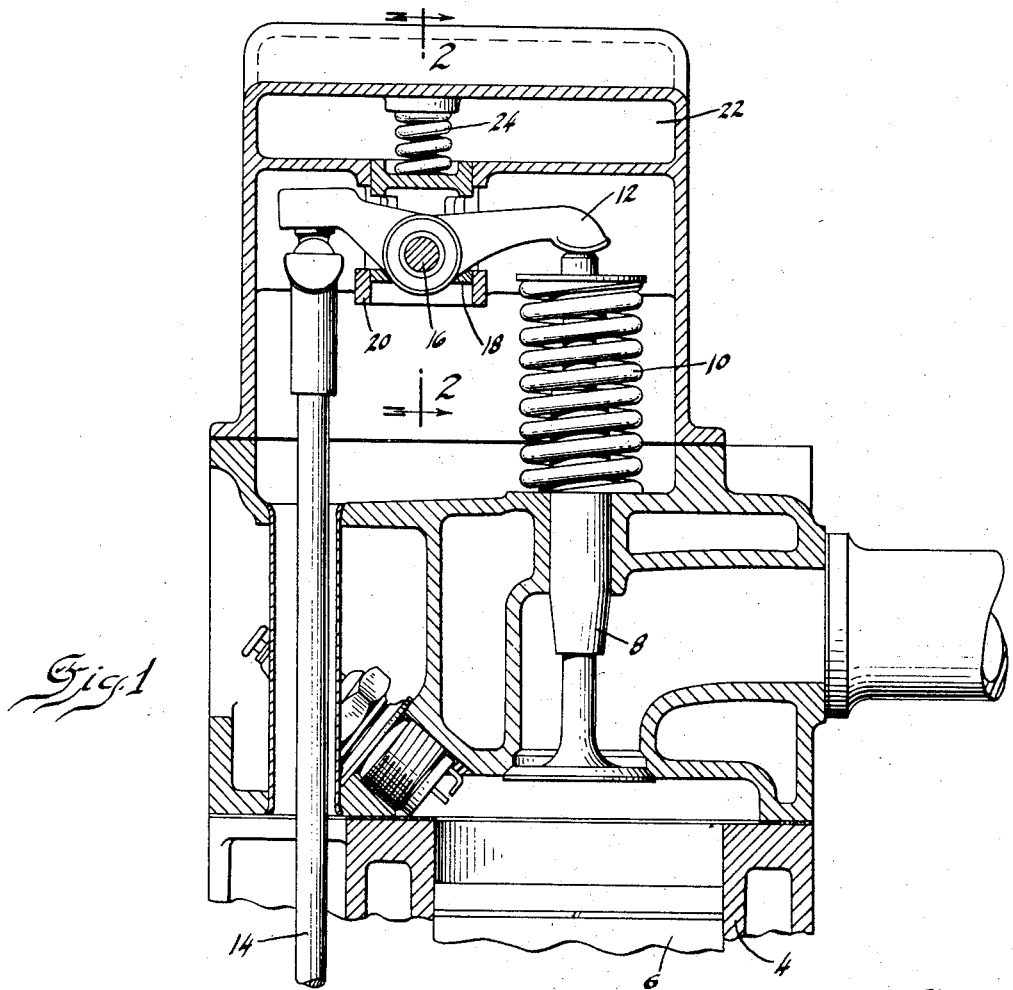

Oct. 17, 1933.  C. R. SHORT  1,930,568

HYDRAULIC VALVE MECHANISM

Filed April 8, 1927

Inventor
Charles R. Short
By Blackmore, Spencer & Hill
Attorneys

Patented Oct. 17, 1933

1,930,568

UNITED STATES PATENT OFFICE 1,930,568

HYDRAULIC VALVE MECHANISM

Charles R. Short, Detroit, Mich., assignor to General Motors Research Corporation, Detroit, Mich., a corporation of Delaware Application April 8, 1927. Serial No. 182,026

9 Claims. (Cl. 123—90)

This invention relates to power transmitting mechanism and particularly to means to take up the lash in such mechanism so as to insure noiseless operation under all operating conditions. The apparatus is particularly designed for use with mechanism designed to operate the valves of engines and is of the type in which a body of oil serves to take up slack in the connections.

It has heretofore been proposed to provide a body of oil between parts of the usual push rod and by replenishing this body of oil, or permitting escape of a portion thereof between active strokes of the push rod, all clearance is taken up so that the gear operates silently. This arrangement has the disadvantage that the oil itself and the modifications required in the push rod parts add weight to the valve gear. The resultant increased inertia causes more energy to be consumed in moving the parts, and also necessitates the use of heavier return springs on the valves with the result that the noise produced by the seating of the valve and by the engagement of the tappet with the cam shaft is increased. Consequently, the advantages of hydraulic operation are only in part secured.

To overcome these difficulties, I apply hydraulic take up mechanism not to the reciprocating parts, but to the rotating parts. Specifically, I provide an hydraulic positioning means for the supports for the pivots of the rocker arms commonly employed in valve mechanism. This positioning means may be in the form of a chamber filled with fluid into which projects a movable part, preferably in the form of a piston, carrying the pivot for a rocker arm. The amount of fluid in the chamber determines the position of the piston and consequently of the pivot of the rocker arm. By providing automatic adjustment of the amount of oil in the chamber, the rocker member is held at all times in constant engagement with the valve and tappet.

Preferably the body of fluid is periodically replenished by connection to the output side of the oil pump customarily used in connection with the lubricating system. As in the construction described and claimed in the application of George E. A. Hallett, Serial No. 126,297 filed July 31st, 1926, I preferably provide for the discharge of oil from the hydraulic chamber at the highest point so as to insure that air particles are carried out by the issuing stream of oil. The oil with the entrained air particles may be returned to the crankcase or, if preferred, may be used to lubricate parts of the engine mechanism.

Further objects of the invention will appear in the course of the following description, and specific features of novelty will be pointed out in the appended claims.

Figure 2:
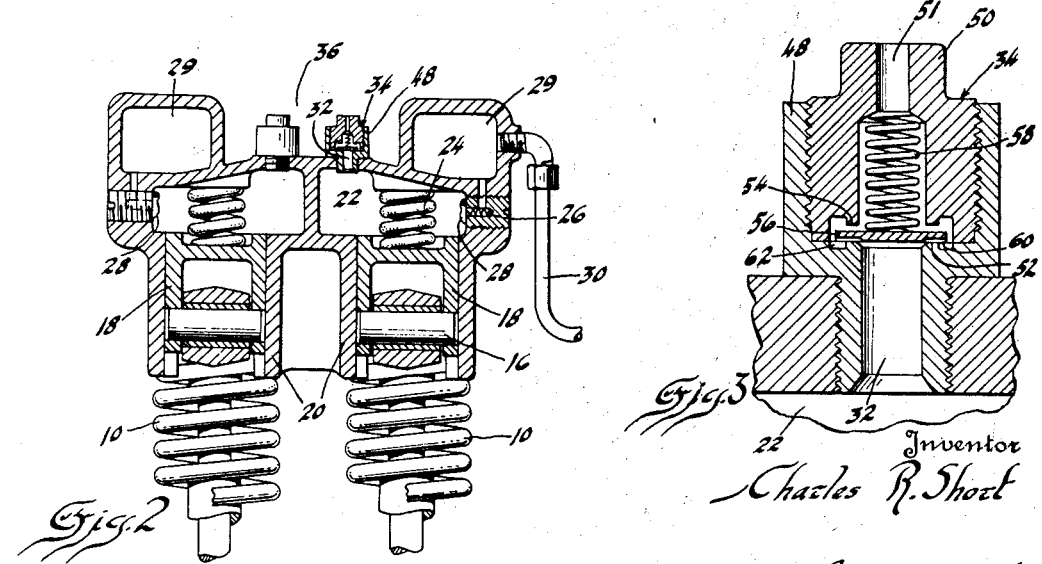
Figure 3:
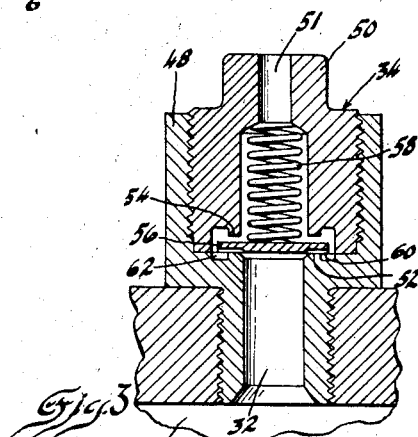

In the drawing, Figure 1 is a vertical section of a portion of an automobile engine to which my slack adjusting device has been applied. Figure 2 is a section on line 2—2 of Figure 1. Figure 3 is an enlarged section of the discharge valve for the fluid chamber. I have indicated at 4 one of the cylinders of an automobile engine. In this cylinder, piston 6 reciprocates. 8 indicates one of the engine valves yieldingly held upon its seat by spring 10. One end of rocker arm 12 engages the upper end of the valve spindle and the opposite end engages push rod 14. The connection between the push rod and rocker arm may be of any preferred character. In the illustrated construction, no provision is made for adjustment as my invention renders this in most cases unnecessary. 16 indicates the pivot of the rocker arm 12. As more clearly shown in Figure 2, this pivot is carried by piston 18 guided for movement in cylinder 20. Cylinder 20 communicates at its upper end with the hydraulic chamber 22.

Spring 24 engages a wall of the chamber 22 at its upper end and the piston 18 at its lower end, and yieldingly urges it in a downward direction. Chamber 22 is supplied with fluid, preferably engine oil, thru port 26 closed by means of inlet valve 28. The port communicates with reservoir 29, which may be supplied with oil from any suitable source. In practice, I prefer to connect the reservoir with the usual pump supplying lubricant to the bearings by means of a suitable conduit such as indicated at 30. At the highest point in the chamber I have provided a discharge port 32 which may be controlled by valve 34. This valve may be of the type described and claimed in the Hallett application referred to. As shown best in Figure 3, it consists of a plug 48 having its lower end threaded for engagement with a threaded aperture provided in the upper portion of the chamber 22. The interior of the upper part of the plug 48 is threaded to receive fitting 50 having a central bore 51. The plug 48 is provided with a seat 52 and the fitting 50 is provided with a seat 54 between which is arranged valve 56 yieldingly forced downwardly by spring 58, housed in an enlarged portion of the bore 51 provided in the fitting 50. The valve 56 is designed to form a tight seal when in engagement with the seat 54 and to have a nonsealing fit when in engagement with the seat 52. For this purpose, it is provided with radial slots 60, these slots affording communication around the edge of the valve in conjunction with recess 62 formed in part in the plug 48 and in part in the fitting 50, valve 56 being of less diameter than the interior diameter of the recess 62.

With this fitting in position as shown in Figures 3, it is apparent that upon the operating stroke of the tappet, valve 56 will be forced into engagement with seat 54 and will tightly seal the vent against the escape of fluid from the chamber 22. Upon the return stroke, the spring 10 will restore the parts to their original position, and the force of this spring is likewise sufficient to hold valve 56 upon its seat 54. However, in this type of engine, each of the sets of valve operating mechanisms is in operation only half of the time, and during the non-operating portions of the cycle, the hydraulic chamber will be relieved of pressure and the spring 58 will force valve 56 against seat 52 and with the parts in this position air which may have collected in the upper portion of the chamber 22 is permitted to escape thru passages 60 and 62 about the periphery of the valve and outwardly thru the bore 51 in the fitting 50. This affords a satisfactory vent for the discharge of air. The oil thus expelled overflows from the trough 36 and is returned to the crankcase, preferably by dripping down thru the openings provided for the tappets. If preferred, a conduit might be provided for the return of oil. As shown in Figure 2, a separate chamber 22 is provided for each of the valves of the engine.

The operation of the mechanism is as follows: The push rod 14 is operated by the cam shaft in the usual manner and causes rocking of the member 12 and consequent opening and closing of the valve 8. It is assumed that the reservoir 29 is filled with oil and that this oil is, during the non-operating portions of the cycle of valve operation, entering the chamber 22 thru the port 26, past valve 28, and a portion of the oil in the chamber is at such times leaving the chamber thru port 32 and returning to the crankcase. With this arrangement, the body of fluid in the chamber 22 is being periodically replenished, and oil and entrained air particles which collect in the upper portion of the chamber are being carried off at least intermittently from the highest point in the chamber thru the valve 34 as described. The chamber 22 is consequently at all times filled with fluid. On the operating stroke of the push rod valves 28 and 56 are seated by the initial pressure applied to piston 18, and as the oil is substantially incompressible piston 18 is held from rising so that it will serve practically as a stationary support for the pivot pin 16. As the engine warms up the push rod and valve stem will expand and, ordinarily, this would have the effect of causing the gear to become too tight so that the valve might be held off its seat even in closed position. At any rate, the parts would bind owing to increased friction. With the present arrangement, the expansion of these parts causes the piston 18 to move upwardly in its guide, reducing the volume of the chamber 22 and causing the excess oil to be discharged from the chamber past the valve 34. With the piston in proper position for operation with no lash with the parts heated, upon cooling clearance would develop and, normally, this would produce noise in the gear. With the disclosed construction, the only effect is that the pressure of the oil supplied the chamber, together with the force of the spring 24, causes the piston 18 to descend during non-operating portions of the valve cycle, a sufficient amount to take up the lash, the chamber 22 being increased in volume by an amount equal to the reduction in displacement of the piston 18 and this added volume being occupied by oil entering from reservoir 29. The parts then operate as before with no lash and, consequently, without noise.

As pointed out, my construction has the great advantage that lash is taken up without increasing the weight of the members comprising the train of mechanism. During the operation of the engine, the piston 18 is practically stationary.

A great many modifications will occur to those skilled in engine design; thus, if preferred, no means need be provided to supply chamber 22 with oil other than perhaps a reservoir, such as shown at 29, replenishing the chamber by gravity flow.

I claim:

1. An engine valve operating mechanism comprising a valve, a push rod, a rocker arm transmitting motion from the push rod to the valve, a piston carrying a bearing for the pivot for said rocker arm, an hydraulic chamber into which said piston extends for determining the position of said piston and means for supplying oil under pressure to said chamber to maintain in the chamber the necessary volume of oil to, at all times, take up the slack in said system.

2. In the combination as defined in claim 1, said hydraulic chamber being provided with a valved passage arranged at the highest point in the chamber.

3. In combination with a mechanical movement adapted to have a variable amount of slack develop therein, stationary hydraulic means for taking up slack in the movement comprising a hydraulic chamber, a piston guided for sliding movement in the chamber and exposed to the fluid therein, means for supplying the chamber with fluid under pressure to force the piston outwardly to take up slack in the system, and an automatic outlet at the highest point in the chamber for the discharge of air and oil, said outlet being closed during normal operation.

4. In combination with a mechanical movement adapted to have a variable amount of slack develop therein and including a rocker member, stationary hydraulic positioning means for said member arranged to adjust the position of the member to maintain the amount of slack in the system at a minimum, said means comprising a hydraulic chamber having a movable wall adapted to move said member, a bearing for the pivot of said rocker carried by said wall, and means for varying the volume of fluid in the chamber to adjust the position of said wall in accordance with variations in slack in the system.

5. In a motion transmitting system including a pivoted member having a shiftable pivot, a stationary hydraulic positioning device for said pivot including a hydraulic chamber, a movable member exposed to the pressure in the chamber, a bearing for the pivoted member carried by said movable member, and means for yieldingly urging said member outwardly of the chamber to move said pivot to take up slack in the system, and means for supplying the chamber with additional fluid upon outward movement of said member.

6. In an engine the combination of valve gear comprising an operating member, an operated member, and a rocker transmitting motion from the operating member to the operated member, said gear being subject to contraction and expansion as a result of changes in temperature of the engine, means for taking up slack in the gear comprising a hydraulic chamber, a piston in the chamber, a bearing for the rocker carried by said piston, a spring for urging the piston outwardly of the chamber to move the pivot to take up slack developed as a result of contraction of the gear, means for supplying the chamber with additional fluid upon outward movement of the piston, and means permitting escape of excess fluid upon expansion of said gear.

7. Operating mechanism for valves and the like comprising a rocker arm, a fixedly mounted member, a member mounted for movement toward and away from said fixedly mounted member, a bearing for said rocker arm carried by said movable member, means yieldingly urging said members apart so as to urge the rocker arm toward the valve mechanism and take up slack in the system and means for damping the reverse movement of said movable member.

8. An engine valve operating mechanism comprising a valve, a push rod, a rocker arm transmitting motion from the push rod to the valve, a piston supporting the pivot for said rocker arm, an hydraulic chamber into which said piston extends for determining the position of said piston and means for supplying oil under pressure to said chamber to maintain in the chamber the necessary volume of oil to, at all times, take up the slack in the said system, said hydraulic chamber being provided with a valved passage permitting discharge of oil on the idle stroke of the push rod.

9. In a valve actuating mechanism for internal combustion engines, a rocker arm having a valve actuating end and an end arranged to be moved to rock the arm about an axis disposed intermediate of the ends, and means movably supporting the arm adjacent its axis, including means resiliently urging the arm axis toward the valve parts and capable of rapid movement, means interposing an additional strong resistance to the movement of the arm axis away from the valve part, and means for varying the degree of resistance against movement of the axis from the valve parts.

CHARLES R. SHORT.